United States Patent [19]
Cox

[11] Patent Number: 5,326,468
[45] Date of Patent: Jul. 5, 1994

[54] WATER REMEDIATION AND PURIFICATION METHOD AND APPARATUS

[76] Inventor: Dale W. Cox, 600 Lairport St., El Segundo, Calif. 90245

[21] Appl. No.: 843,389

[22] Filed: Mar. 2, 1992

[51] Int. Cl.$^5$ .......................... C02F 9/00; C02F 1/00; C02F 1/32; F15D 1/02
[52] U.S. Cl. ................................. 210/96.1; 210/103; 210/109; 210/97; 210/134; 210/143; 210/149; 210/195.1; 210/259; 210/748; 210/764; 210/765; 210/669; 138/45; 138/46; 241/1; 73/861.63
[58] Field of Search ........................ 210/96.1, 748, 103, 210/259, 109, 765, 188, 764, 195.1, 149, 143, 134, 97, 908, 909, 669; 138/45, 46; 241/1; 239/499; 73/861.63

[56] References Cited
U.S. PATENT DOCUMENTS

| | | | |
|---|---|---|---|
| 1,249,601 | 12/1917 | Ferranti | 138/46 |
| 2,434,835 | 1/1948 | Colley | 138/46 |
| 2,518,625 | 8/1950 | Langstaff | 138/45 |
| 2,587,188 | 2/1952 | McFadden | 138/45 |
| 2,590,215 | 3/1952 | Sausa | 138/45 |
| 2,633,154 | 3/1953 | Eastman | 138/46 |
| 2,735,642 | 2/1956 | Norman | 138/45 |
| 2,911,787 | 11/1959 | Barry | 138/45 |
| 3,017,903 | 1/1962 | Steffens | 138/45 |
| 3,236,263 | 2/1966 | Holdereu | 138/45 |
| 3,244,199 | 4/1966 | Hayes | 138/45 |
| 3,353,560 | 11/1967 | McCalloch | 138/46 |
| 3,685,786 | 8/1972 | Woodson | 138/45 |
| 3,724,503 | 4/1973 | Cooke | 138/46 |
| 3,791,764 | 2/1974 | Summer | 138/45 |
| 3,949,025 | 4/1976 | Englert | 138/45 |
| 4,076,617 | 2/1978 | Bybel | 210/748 |
| 4,586,873 | 5/1986 | Lepretre | 138/45 |
| 4,906,387 | 3/1990 | Pisani | 210/765 |
| 4,961,860 | 10/1990 | Masri | 210/748 |
| 4,983,189 | 1/1991 | Peterson | 210/748 |
| 4,990,260 | 2/1991 | Pisani | 210/765 |

*Primary Examiner*—Thomas M. Lithgow
*Attorney, Agent, or Firm*—Allen A. Dicke, Jr.

[57] ABSTRACT

The water remediation and purification apparatus includes a cavitation nozzle which is operated with a throat size and pressure drop to incur cavitation in the water. The explosive and implosive bubble growth and collapse produces free radicals which interact with contaminants in the water to oxidize the contaminants. The cavitation process is enhanced by (1) a variable throat nozzle, (2) recycling the product back through the nozzle for further oxidation, and (3) programmable control feedback. Subsequent ultraviolet radiation from high energy lamps, ion exchange and/or degassifying treatment can be employed to produce water quality within acceptable levels.

3 Claims, 3 Drawing Sheets

WATER REMEDIATION AND PURIFICATION METHOD AND APPARATUS

FIELD OF THE INVENTION

This invention is directed to a method and apparatus for the remediation and purification of water by means of oxidation of the contaminants therein. Oxidation is produced by action of a cavitation nozzle having a variable throat to optimize cavitation conditions for particular contaminants, flow and pressure. Oxidation is further continued by the use of high energy ultraviolet radiation.

BACKGROUND OF THE INVENTION

There is increasing knowledge of the danger to future humanity of the discharge of contaminated water into the subsurface water table, rivers or into the sea. Accordingly, efforts are being made to remove various contaminants from water before it is reused or discharged. If such water is not reused, it is considered a waste stream which is leaving a processing area and is processed before being disposed of by discharge into the underground basin, rivers, or the sea. A number of processes have been employed to attempt to clarify water waste streams. However, in the case of already contaminated ground water, it is pumped to a remediation process line(s). Sometimes the contaminants are in the form of organic contaminants, from a wide range of hydrocarbons, to bacteria, such as salmonella and E. Coli. Other times, inorganics are included. The principal components of such contaminants are carbon and hydrogen. One important way for the purification of hydrocarbon-containing water waste streams is the oxidation of the organic contaminants. When the carbon and hydrogen are oxidized, the remaining materials are usually in such small concentration that they present no problem. Inorganic metals remaining after such oxidation can sometimes be converted to soluble salts or precipitated out.

Various methods of oxidation and separation have been attempted. Oxidation has been attempted by bubbling air or substantially pure oxygen or ozone through the water waste stream, or by irradiating with ultraviolet radiation. Such oxidation attempts have been practiced at substantially ambient temperatures and, as a result, with little ionization and no temperature increase, the oxidation reaction has been limited.

When the water waste stream is pumped through a cavitation nozzle, desirable effects occur which result in ionization of the water which causes oxidation of the contaminants. However, cavitation nozzles of fixed dimension have a limited dynamic range in which they can operate at optimum conditions. Thus, there is need for improvement.

SUMMARY OF THE INVENTION

In order to aid in the understanding of this invention, it can be stated in essentially summary form that it is directed to a water remediation and purification method and apparatus wherein the apparatus includes a cavitation nozzle with variable throat so that optimum cavitation conditions can be achieved for different conditions of contaminant, pressure and flow. Preferably, the throat is continuously controlled by process parameters to optimize contaminant oxidation.

It is, thus, an object and advantage of this invention to provide a water remediation and purification method and apparatus which includes a variable cavitation nozzle so that the nozzle conditions can be changed during flow therethrough to continuously adjust cavitation conditions so that the process may be continuously optimized for complete oxidation of contaminants.

It is another object and advantage of this invention to provide a water remediation and purification method and apparatus which has a control system in association with a variable cavitation nozzle so that the cavitation nozzle is adjusted to optimum conditions in accordance with process parameters.

It is another object and advantage of this invention to provide a water remediation and purification method and apparatus which has a control system in association with a constant diameter throat cavitation nozzle so that the process flow is adjusted for optimum conditions in accordance with process parameters.

It is another object and advantage of this invention to provide a water remediation and purification method and apparatus wherein a variable throat cavitation nozzle used for treating contaminated water is arranged in association with a recycling circuit for return of cavitation processed water and in association with a high energy ultraviolet reactor following the cavitation nozzle to further treat the processed water, the UV reactor output also arranged in association with a recycling circuit.

It is a further object and advantage of this invention to provide a water remediation and purification method and apparatus which includes pretreatment of a water waste stream followed by a variable cavitation nozzle which, in turn is followed by a high energy ultraviolet reactor and/or further water purification including ion exchange, degassification and filtering so that processed water results.

Other objects and advantages of this invention will become apparent from a study of the following portion of the specification, the claims and the attached drawings.

DESCRIPTION OF THE PREFERRED EMBODIMENT

Figure 1:
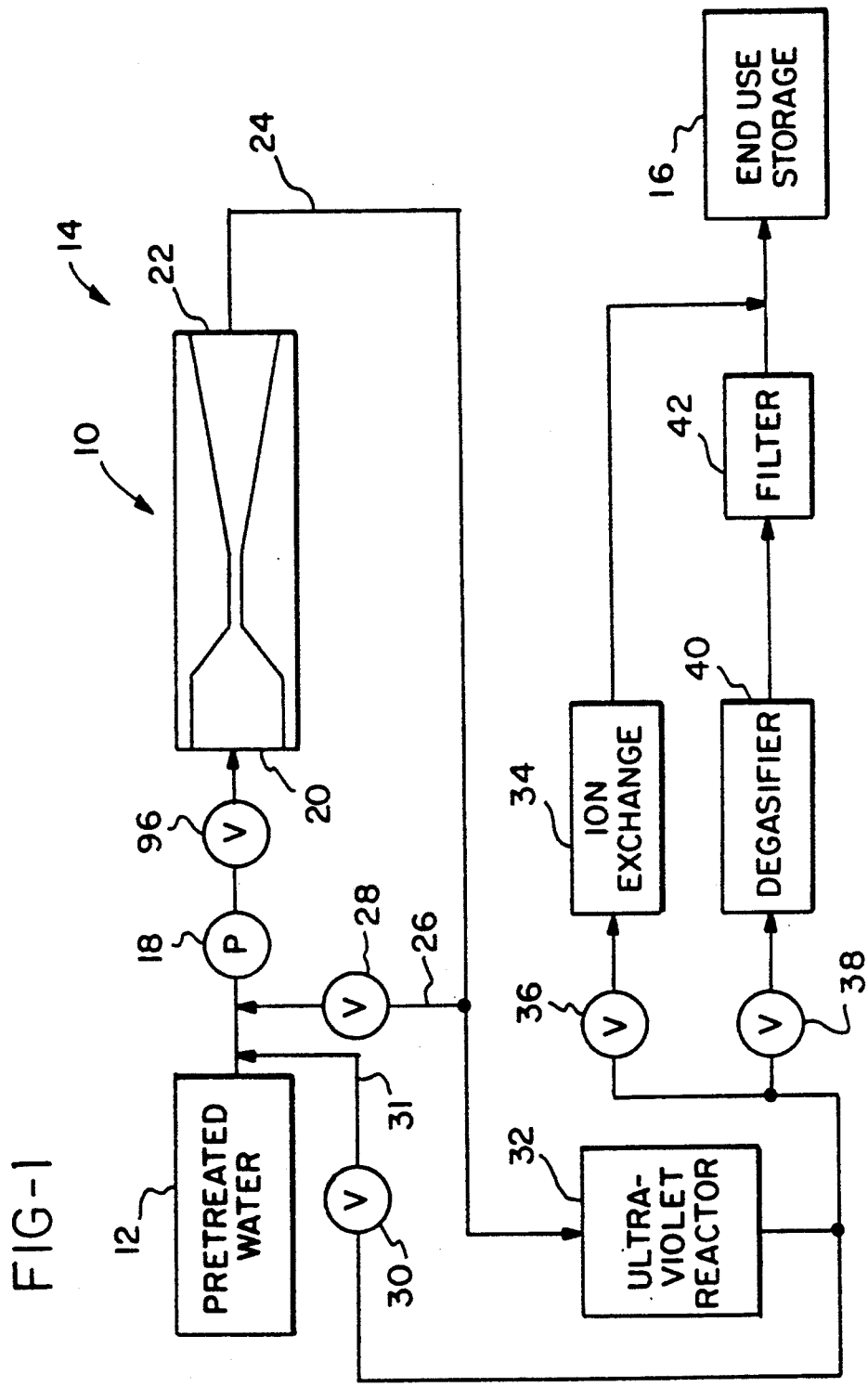
FIG. 1 is a schematic water flow diagram of a water processing system which incorporates the variable throat nozzle of this invention.
Figure 2:
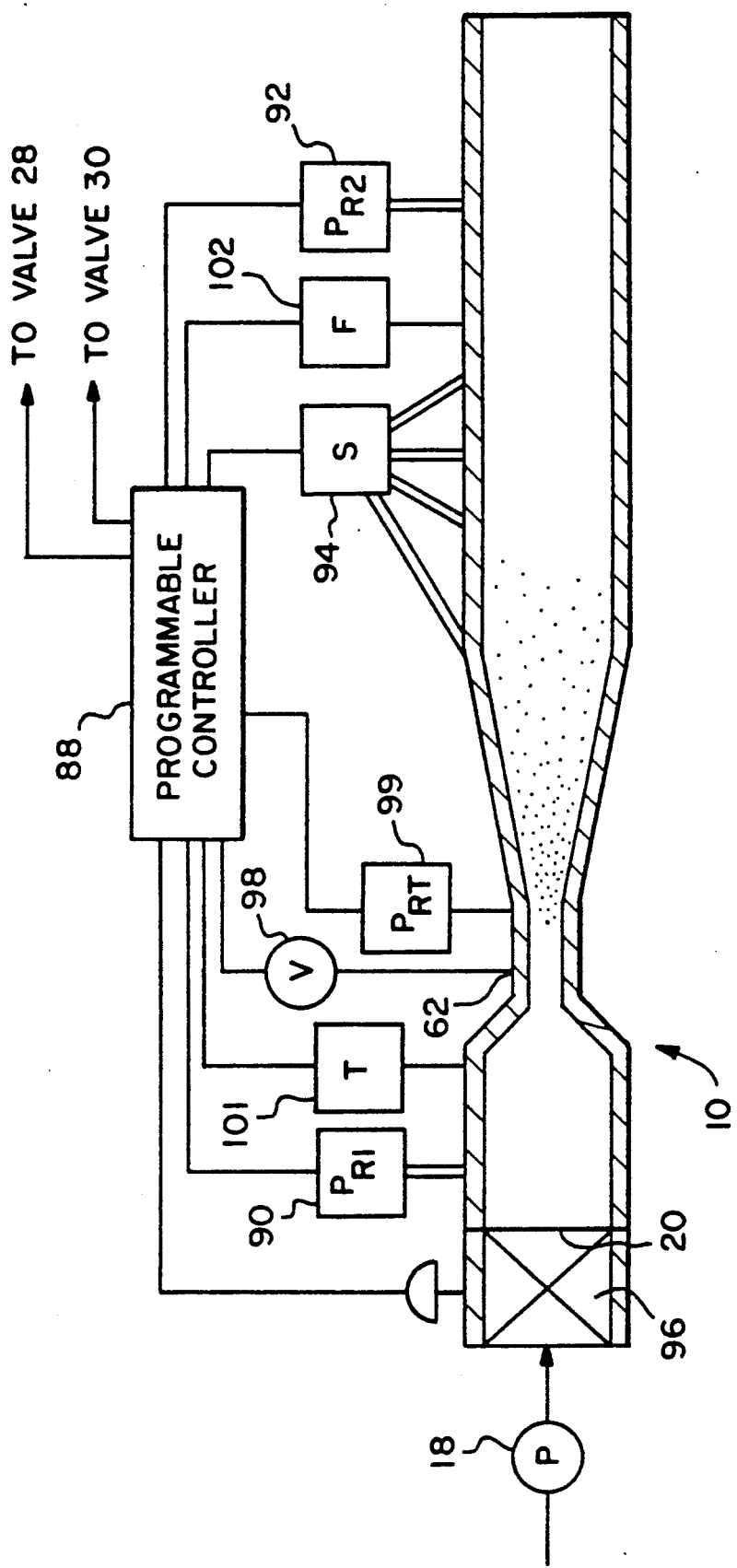
FIG. 2 is a longitudinal section through a substantially schematically depicted variable throat cavitation nozzle in association with its sensors and controls.
Figure 3:
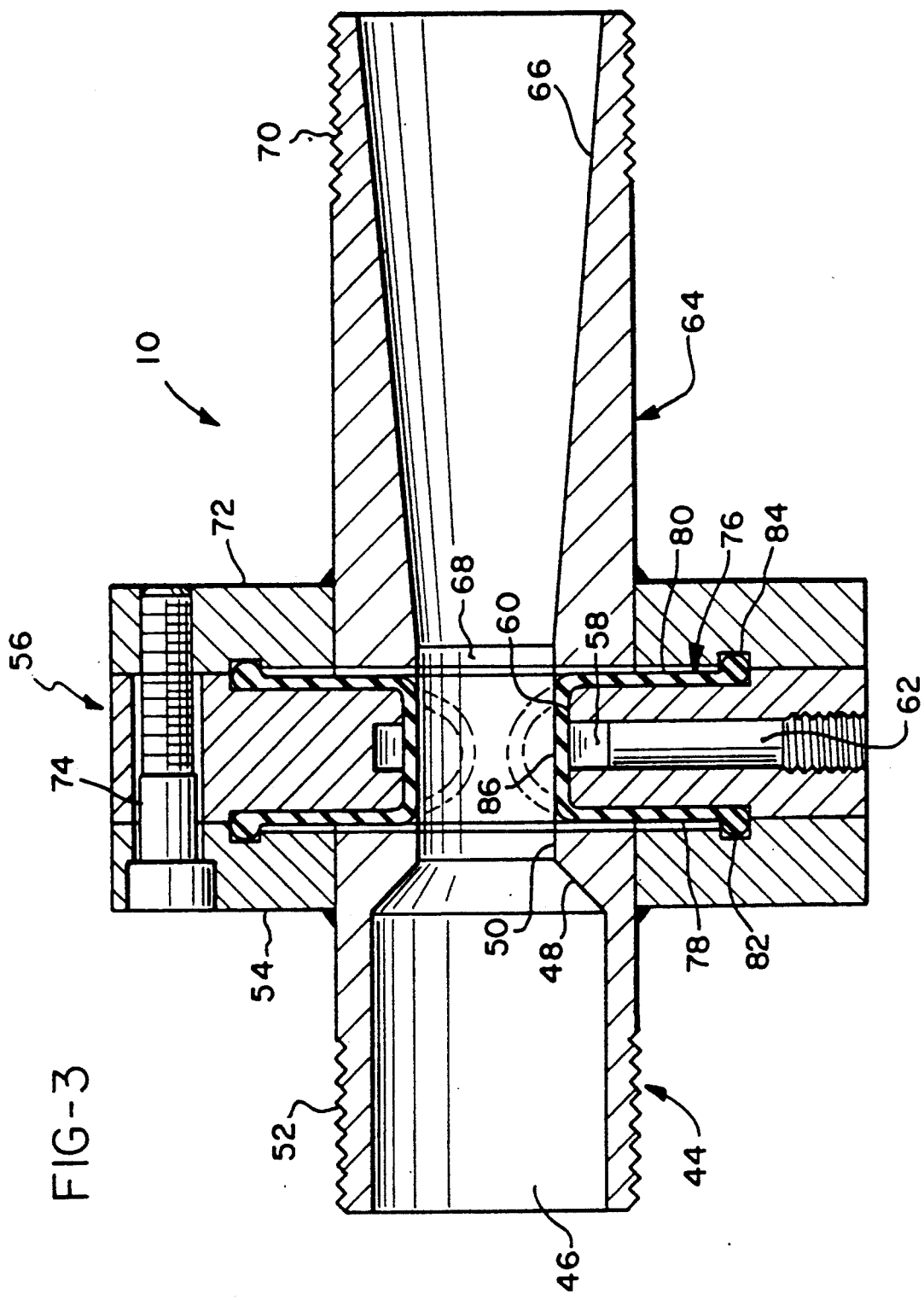
FIG. 3 is a longitudinal section through the cavitation nozzle used in association with the system of this invention.

The cavitation nozzle 10 shown in FIGS. 1, 2 and 3 is at the heart of the present invention. The cavitation nozzle 10 is used to cause cavitation in a water waste stream passing therethrough to aid in the remediation and purification of the waste stream. As seen in FIG. 1, the waste stream originates with pretreated water coming from pretreated water source 12. The pretreatment of the water may include any one of the usual pretreatments which vary in accordance with the contaminants in the water and the intended utilization of the water. For example, the pretreatment may include flocculation and settlement, as well as anti-bacteriological treatment, free oil separator, filtration or neutralization.

The system of this invention is generally indicated at 14 in FIG. 1 and includes the cavitation nozzle, as well as post-treatment from the cavitation treatment and delivery to an end use storage 16. The end use may be recycled into a water-utilizing process, or the end use may be the delivery into a potable water system, an underground basin, a river, or the sea. To a certain extent, the water remediation and purification method depends upon the end use to which the water is to be placed. Therefore, the treatment around the cavitation nozzle 10 is a function of the ultimate need.

The pretreated water is drawn from source 12 by pump 18, which delivers the water to the inlet 20 of nozzle 10. The water passing through the nozzle 10 is subjected to cavitation, as is described in more detail hereinafter, and the outlet of the cavitation nozzle delivers the cavitation treated water through cavitation nozzle outlet line 24. Since the water in line 24 may be improved by further cavitation treatment, recycle lines 26 and 31 and recycle valves 28 and 30 are provided. A certain portion of that water in outlet line 24 thus passes again through the cavitation nozzle. Preferably, the cavitation treatment is followed by treatment in a high energy ultraviolet reactor 32. Recycle control valve 30 controls the flow of the cavitation/ultraviolet treated water to further cavitation treatment processes. Additional treatment processes are determined by the end use of the water.

Ultraviolet treatment of water for the purpose of water purification is described in U.S. Pat. Nos. 4,906,387 and 4,990,260, the entire disclosures of which are incorporated herein by this reference. However, the ultraviolet source of the above inventions were conventional low pressure mercury lamps. These lamps produce resonance radiation at 253.7 and 185.0 nm. Their disadvantage is that the mercury sources are relatively low intensity because the process by which a photon is emitted from an excited atom is reversible; i.e., mercury atoms will begin to reabsorb radiation as the input energy is increased.

The high energy ultraviolet reactor 32 could be a Xenon flash lamp. The Xenon flash lamp produces a unique source of high intensity, high energy ultraviolet radiation over a significant range of the spectrum (185 to 330 nm). For example, at approximately 230 nm, the Xenon flash lamp produces about 375 times more relative intensity than a Hg lamp; and at 253.7 nm, the Xenon flash lamp produces approximately 8 times more relative intensity than the Hg lamp.

Following high energy ultraviolet treatment, the water stream can be treated further by ion exchange device 34. As a particular example of ion exchange, sodium ions can be exchanged for calcium ions in the water to improve its "softness." From the ion exchanger, the water passes to the end uses represented by storage 16. Valve 36 controls the flow through the ion exchanger, while valve 38 controls alternative flow through degassifier 40 and filter 42. These treatments might be more useful in some water flow circumstances where gases and/or particulates are produced by the cavitation and/or the high energy Xenon pulse ultraviolet purification.

The structural detail of the cavitation nozzle 10 is shown in longitudinal section in FIG. 3. Inlet body 44 is a tube having an inlet passage 46 which converges in a cone 48 which defines the inlet throat 50. The exterior of the inlet body 44 has attachment means thereon such as threads 52 or other connecting means. The inlet body also carries inlet body flange 54, which is welded or otherwise secured thereto. Throat body 56 lies against flange 54. The throat body is a flat annular disc which is externally the same size as the flange 54. The throat body carries an annular channel 58 therein around its inner opening defined by inner wall 60. Port 62 connects the annular channel 58 to exterior connection.

Outlet body 64 is a tubular body having an interior tapered expansion wall 66, which extends from the outlet throat 68 to the right-hand outer end of outlet body 64. The outlet throat 68 is the same diameter and is in alignment with the inlet throat 50. The large end of the expansion wall 66 is essentially the same diameter as inlet passage 46. Attachment means on the outlet body 64 permit its attachment into a hydraulic system. Threads 70 are an example. The outlet body 64 is secured in the nozzle by means of flange 72 welded to the outlet body. Flanges 54 and 72 are clamped together with the throat body 56 therebetween by a plurality of bolts, one of which is indicated at 74.

The throat of cavitation nozzle 10 is variable. This is accomplished by means of throat member 76. The throat member 76 is annular in plan and is U-shaped in cross section. The throat member is made of a resilient elastomeric material, such as Viton, which is resistant to attack by the water to be delivered through the nozzle 10 and its contaminants. The throat member 76 includes circular rings 78 and 80, which respectively terminate in O-rings 82 and 84. The 0-rings 82 and 84 are respectively received in 0-ring grooves and flanges 54 and 72, both to seal the flanges with respect to the throat body and to seal the throat member 76 with respect to the throat body. The throat body is of reduced thickness to receive the rings 78 and 80 and to permit them some expansion space for resilient deflection. The rings of the throat member are joined by variable throat 86 which, together with rings 78 and 80, define the U-shaped cross section of the throat member. The throat member is molded in one piece. Thus, the various parts thereof are integrally joined.

When the cavitation nozzle 10 is placed in a system such as a system 14, the air pressure into port 62 can control the throat diameter by distending or contracting the throat 86. A reduced throat is achieved, such as indicated by dot-dash lines in FIG. 3. Other configurations are useable in this invention, such as a variable aperture similar to that used in a camera lens or a tapered rod movable into and out of the annulus of the throat thereby controlling throat area. When water is delivered through the cavitation nozzle 10 under the proper conditions, cavitation is produced. Cavitation is caused by dynamic pressure reduction at essentially constant temperature. Cavitation involves the entire sequence of events beginning with bubble formation and extending through cavity collapse. The bubble growth will be explosive if it is primarily the result of vaporization in the cavity. Cavitation is produced by a critical flow cavitation nozzle. Cavitation effectiveness varies with throat diameter, nozzle surface finish, dissolved air in the liquid, and liquid flow and pressure. The cavitation nozzle 10 has a variable throat which is controlled by feedback from various sensors, as described hereinafter, to optimize cavitation. The cavitation phenomenon which results in the formation and collapse of micro-bubbles is contained in the expanding diameter outlet body. The cavitation is directly influenced by the pressure differential between the inlet and outlet of the cavitation nozzle 10. Decreasing the throat diameter will increase the pressure differential across the throat and increase the length of the stream that is cavitating. This increases the number of nucleation sites at which cavitation begins and extends the length of the cavitating flow.

Free radicals are generated by cavitation. The free radicals are principally hydrogen atoms $H^+$ and hydroxyl radicals $OH^-$. The free radicals are generated by the cavitation and are maintained by a combination of cavitation, seeding with other constituents, and subsequently high energy ultraviolet excitation. Organics, living organisms and some inorganics can be treated. When the waste stream includes organic waste, they are oxidized into carbon dioxide, water and sulfates by the available free radicals. Usually the waste stream, particularly when it is contaminated ground water or waste water, contains unknown organic chemicals. However, the free radicals resulting from the cavitation causes oxidation reactions to varying degrees in all organic materials.

Living organisms such as salmonella and E. Coli are destroyed when their cells' outer protective shell and cell wall rupture after cavitation. Since bacterial aerobic metabolism reduces fluid alkalinity (U.S. Pat. No. 5,013,442), destroying bacteria raises the alkalinity, and thus provides a measurement detectable by a sensor to evaluate the effectiveness of the cavitation process when processing bacteria and other living organisms. Suitable sensors can react to the changes in chemical characteristics in the stream and, through suitable transducer and programmable controller, can control the inlet pressure to the cavitation nozzle and its throat diameter to reach an optimum steady state cavitation flow and, as a result, reduction in contaminants.

Cavitation is very useful in the breakdown of organic chemicals. In cavitated water, "the heat from cavity implosion decomposes water into extremely reactive hydrogen atoms and hydroxyl radicals. During the quick cooling phase, hydrogen atoms and hydroxyl radicals recombine to form hydrogen peroxide and molecular hydrogen. If other compounds are added to the water .... a wide range of secondary reactions can occur. Organic compounds are highly degraded in this environment and inorganic compounds can be oxidized or reduced" (Scientific American, Feb. 1989, p. 84).

In other cavitation experiments, the temperature of collapsing bubbles has been determined experimentally to be 5075 degrees K $+/-156$ degrees K. This high temperature provides insight to the efficacy of the cavitation process for breaking down complex organic compounds (Science, 20 Sep. 1991, Vol. 253, p. 1397).

The variable cavitation nozzle thus provides an additional control for optimizing the cavitation process. Referring to FIG. 2, the sensing and control associated with the cavitation nozzle 10 are shown. Controller 88 is programmable and receives inlet and outlet pressure signals from inlet and outlet pressure transducers 90 and 92. It receives throat vacuum measurements from throat vacuum transducer 99, inlet temperature from inlet temperature transducer 101, and flow data from flow transducer 102. It also receives other signals from sensor and transducer 94. These signals may be chemical constituent concentration signals which indicate the effectiveness of the cavitation process in oxidizing contaminants at existing settings and conditions.

The controller 88 controls both the inlet valve 96 to control total flow through the cavitation nozzle and controls the pressure output of pump 18 at the inlet to the nozzle. The programmable controller also controls valve 98 which controls the fluid pressure to port 62 and thus controls the throat diameter. The controller 88 could be equally effective in a case of a fixed nozzle cavitation system wherein a number of inputs to the controller 88 from inlet pressure 90, outlet pressure 92, vacuum 99, temperature 101, and flow 102 produce signals to pump 18 and valve 96 to control cavitation to provide an optimum process.

There are a number of sensors and transducers 94 available to further control the process. The sensors range from simple temperature gauge and pH meters to flow rate, vacuum indicator, conductivity meters, dissolved oxygen meters, oxidation reduction potential meters, biological oxygen monitors, etc. For example, in tannery waste water removal rates of TOC (Total Organic Carbon), COD (Chemical Oxygen Demand) and protein content are interdependent. In the presence of an initiator such as hydrogen peroxide, sulfides are removed which instantly lowers the pH of the waste stream. This drop in pH gives immediate indication of the effectiveness of the cavitation nozzle.

In an actual ground water remediation project at an abandoned CHEVRON service station, the initial flow from underground pumps to a manifold preceding the purification system with a fixed nozzle was approximately 10 gpm. After several months of unattended operation, flow reduced to about 5 gpm. At these flow rates, the fixed nozzle was at the low end of its effectiveness. Subsequently, flow dropped further to about 1 gpm as the contaminated ground water was depleted. A variable nozzle with its attendant feedback control would have provided optimum performance of the cavitation process over these wide ranges of flow. Given below are examples of other specific treatments.

EXAMPLE 1

With a 0.141 inch throat nozzle in a Laboratory Test Cavitation Unit, using a known dosage of phenol, the maximum flow rate possible to reduce the phenol from 16 ppm to 6 ppm was 0.75 gpm. In the same test, substituting a 0.375 inch throat nozzle, the flow rate was increased to 5 gpm and the phenol concentration reduced to less than 4 ppm, thereby demonstrating the optimization of the cavitation process. Other conditions were constant. Recycle and UV were used.

EXAMPLE 2

With a 0.141 inch throat nozzle in a Laboratory Test Cavitation Unit, a salmonella inoculation of 238,000 CFU/ml was reduced 85 percent at a flow rate of 0.95 gpm. Optimizing the cavitation process through substituting a 0.238 inch throat nozzle, a salmonella inoculation of 2,300,000 CFU/ml was reduced by a 99.999 percent (or eight magnitudes) at a flow rate of 0.95 gpm. Other conditions were constant. Recycle UV and 60 ppm hydrogen peroxide have been used.

This invention has been described in its presently contemplated best embodiment, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A nozzle comprising:
    an inlet body having an inlet opening therethrough, said inlet body having means for connecting a pressurized stream of contaminated water thereto in communication with said inlet opening;

a throat body lying adjacent to and connected to said inlet body, said throat body having an opening therethrough, said throat body opening being in alignment with said inlet opening;

a resilient throat member attached to said throat body, said resilient throat member lying in said opening through said throat body so that said throat member defines a nozzle throat;

a fluid pressure port in said throat body, said fluid pressure port being connected between said throat member and said throat body so that pressurizing said port pressurizes said throat member to resiliently distend said throat member to reduce throat area therethrough;

an outlet body lying adjacent to and connected to said throat body, said outlet body having an outlet opening therethrough in line with said throat opening, said outlet opening being formed by a tapered expansion wall defining an expansion chamber therein, said wall being shaped to expand contaminated water passing through said throat to maintain optimum cavitation in the water as it moves through the length of said expansion chamber; and means for sensing conditions in the contaminated water stream at the inlet and outlet of said nozzle and control means for controlling the pressure in said port to control nozzle area, said sensor means being connected to said control means wherein said control means varies the nozzle throat to optimize cavitation conditions in response to the sensed conditions in said inlet and outlet of said nozzle.

2. The nozzle of claim 1 wherein said throat member has a first ring extending between said inlet body and said throat body and has a second ring extending between said throat body and said outlet body and said throat member has a throat therein connecting said first and second rings, said throat body and said rings forming a throat member which is unitarily formed.

3. The nozzle of claim 2 wherein said first ring has a first O-ring formed thereon and said second ring has a second O-ring formed thereon, a first O-ring groove between said inlet body and said throat body and a second O-ring groove between said throat body and said outlet body, said first and second O-rings respectively occupying said first and second O-ring grooves so as to clamp and seal said throat member with respect to said throat body.

* * * * *